United States Patent
Xiao et al.

(10) Patent No.: US 7,300,902 B2
(45) Date of Patent: Nov. 27, 2007

(54) CATALYST FOR POLYMERIZATION OF ETHYLENE, PREPARATION THEREOF AND USE OF THE SAME

(75) Inventors: Mingwei Xiao, Shanghai (CN); Shijiong Yu, Shanghai (CN); Xiaofeng Ye, Shanghai (CN); Zixiao Chai, Shanghai (CN)

(73) Assignees: China Petroleum & Chemical Corporation, Beijing (CN); Shanghai Research Institute of Chemical Industry, Shanghai (CN)

( * ) Notice: Subject to any disclaimer, the term of this patent is extended or adjusted under 35 U.S.C. 154(b) by 0 days.

(21) Appl. No.: 10/533,694

(22) PCT Filed: Oct. 30, 2003

(86) PCT No.: PCT/CN03/00924

§ 371 (c)(1),
(2), (4) Date: Aug. 30, 2005

(87) PCT Pub. No.: WO2004/050723

PCT Pub. Date: Jun. 17, 2004

(65) Prior Publication Data

US 2006/0094589 A1 May 4, 2006

(30) Foreign Application Priority Data

Nov. 4, 2002 (CN) ................. 02 1 45028

(51) Int. Cl.
*C08F 4/626* (2006.01)
*C08F 4/628* (2006.01)

(52) U.S. Cl. ............. 502/115; 502/103; 502/104; 502/120; 502/128; 502/132; 526/124.3; 526/124.5; 526/125.7

(58) Field of Classification Search ............. 502/103, 502/115, 120, 128, 104, 132; 526/124.3, 526/124.5, 125.7
See application file for complete search history.

(56) References Cited

U.S. PATENT DOCUMENTS 6,303,716 B1 * 10/2001 Xiao et al. ............ 526/129
2005/0075241 A1 * 4/2005 Fottinger et al. ......... 502/102

FOREIGN PATENT DOCUMENTS

| CN | A-1104220 | 6/1995 |
| CN | A-1223267 | 7/1999 |
| CN | A-1223268 | 7/2000 |
| DE | 4235405 | * 4/1994 |

* cited by examiner

*Primary Examiner*—Caixia Lu
(74) *Attorney, Agent, or Firm*—Harness, Dickey & Pierce, P.L.C.

(57) ABSTRACT

The present invention provides an ethylene polymerization catalyst. The present invention also provides a process for preparing the ethylene polymerization catalyst, comprising reacting powdered magnesium with an alkyl halide of formula RX in the presence of an ether solvent to form a magnesium compound having a structure represented by the formula $(RMgX)_p(MgX_2)_q$, in which R is an alkyl group having from 3 to 12 carbon atoms, X is halogen, and molar ratio of q to p is in the range of from larger than 0 to 1, impregnating the magnesium compound onto silica carrier, reacting the silica loading the magnesium compound with an alkyl halide of formula $R^1X$, a titatium compound and an alkyl aluminum compound to form a main catalyst component, contacting the main catalyst component with a cocatalyst component to form catalyst for ethylene polymerization. The present invention also relates to the use of the catalyst in the polymerization of ethylene.

12 Claims, No Drawings

US 7,300,902 B2

CATALYST FOR POLYMERIZATION OF ETHYLENE, PREPARATION THEREOF AND USE OF THE SAME

CROSS REFERENCE TO RELATED APPLICATION

The present application is the National Phase, under 35 U.S.C. § 371, of PCT/CN2003/00924, filed on Oct. 30, 2003, and claims priority to CN02145028.5, filed on Nov. 4, 2002, which is incorporated herein by reference in its entirety and for all purposes.

TECHNICAL FIELD

The present invention relates to a solid catalyst suitable for ethylene polymerization, a process for preparing the same and use of the same in ethylene polymerization.

BACKGROUND OF THE INVENTION

Condensing mode (CM) technique and Super condensing mode (SCM) technique raise productivity of gas phase process of ethylene polymerization by from 50 to 100 percent and from 60 to 300 percent, respectively. Activity of conventional catalysts for gas phase process of ethylene polymerization is typically in the range from 3,000 to 5,000 grams polyethylene per gram catalyst so that they are not suitable for these new techniques. Therefore, big companies in the world have been researching higher-activity catalysts useful for gas phase polymerization of ethylene.

Increasing atom ratio of magnesium to transition metal element and increasing amount of transition metal element in catalyst are effective methods for improving activity of catalyst. EP0771820 discloses a supported catalyst and improves conventional impregnating processes. First, an impregnating solution containing magnesium, titanium and an electron donor is formed, the impregnating solution is mixed with a carrier, and the solvent is evaporated, then the carrier is impregnated with the impregnating solution with same composition once more, and the solvent is evaporated. Impregnating may be repeated for many times as required. Repeated impregnating can insure magnesium chloride distributing in the pore of the carrier as uniformly as possible. As a result, a high ratio of Mg/Ti is obtained, and the resulting catalyst has less agglomerates and high activity. However, the catalyst preparation procedure needs repetitious impregnating (at least two times), and concentration and volume of the impregnating solution are necessary to be strictly controlled based on the varying of pore volume of carrier, which renders the preparation procedure quite complicated. Moreover, amount of the electron donor is greatly increased, therefore, the production cost is increased, and load of solvent recycling unit is also increased.

Another method for obtaining high ratio of Mg/Ti so as to prepare high-activity catalyst is spray-drying process. U.S. Pat. No. 4,293,673 and WO 01/05845 disclose methods for preparing catalyst by spray drying. Said spray drying processes are performed by forming uniform slurry from fumed silica as carrier and catalyst components, followed by spray drying. Since surface area of fog drops is large, drying time of catalyst is short, catalyst particles are dispersed uniformly, and the morphology of catalyst particles is easily controlled, thus spray drying is favorable for improving the activity of catalyst. Moreover, when same impregnating solution is used, one time higher Mg/Ti ratio than that obtained by conventional impregnating processes is obtained by spray drying, meanwhile, larger amount of titanium and no agglomerates are obtained. But the catalyst particles produced by spray drying process must be collected in a mineral oil, therefore, equipment cost for catalyst production is increased and production operation is more difficult. U.S. Pat. No. 6,303,716 discloses a process for preparing a high-activity solid catalyst for producing all-density polyethylene by gas phase polymerization. Said process comprises the step of: using powdered magnesium as raw material to form a magnesium halide in nascent state; reacting the magnesium halide in nascent state with titanium tetrachloride, diethyl aluminum chloride in the presence of tetrahydrofuran to form a complex; supporting the complex onto silica carrier; and heating and drying the silica carrier loading said complex to form a solid main catalyst component. The catalyst is advantageous for a simple preparing procedure and high catalytic activity. In practical production, the catalytic activity can be greatly increased by increasing the amount of titanium in the catalyst. However, with the remarkable increase of amount of titanium in the catalyst, amount of magnesium chloride is correspondingly increased, accordingly the viscosity of impregnating solution is larger so that overmuch magnesium chloride is deposited on the surface of the carrier, and the formation of agglomerates is serious. As a result, the yield of catalyst product is inevitably reduced and the production cost is increased in industrial production.

SUMMARY OF THE INVENTION

An object of the present invention is to provide a high-activity solid catalyst for ethylene polymerization, which uses, as magnesium halide source, a magnesium compound represented by a formula $(RMgX)_p(MgX_2)_q$, in which R is an alkyl group having from 3 to 12 carbon atoms, X is halogen, and molar ratio of q to p is in the range from larger than 0 to 1, preferably from 0.05 to 0.95.

Another object of the present invention is to provide a process for preparing high-activity solid catalyst suitable for ethylene polymerization.

Still another object of the present invention is to provide the use of the catalyst in ethylene polymerization.

DETAILED DESCRIPTION OF THE INVENTION

In the first aspect, the present invention provides a high-activity solid catalyst for ethylene polymerization, which uses, as magnesium halide source, a magnesium compound represented by a formula $(RMgX)_p(MgX_2)_q$, in which R is an alkyl group having from 3 to 12 carbon atoms, X is halogen, preferably chlorine, and molar ratio of q to p is in the range from larger than 0 to 1, preferably from 0.05 to 0.95.

The magnesium compound useful in the present invention can be prepared by reacting powdered magnesium with an alkyl halide of formula RX in an ether solvent, wherein the alkyl halide is used in such an amount that the molar ratio of the powdered magnesium to the alkyl halide is in the range from 1:1 to 1:3, preferably from 1:1 to 1:2. When the reaction temperature is raised to 60 to 70° C., the alkyl halide is added to the powdered magnesium in one-step charging or dropwise. If dripping manner is employed, dripping period can be controlled in the range of from 10 minutes to 2 hours. Upon completion of the addition, the reaction is maintained for 2 to 8 hours, preferably 3 to 6 hours. The entire preparation procedure is performed at a temperature from 20 to 80° C., preferably from 40 to 70° C. The ether solvent may be aliphatic hydrocarbyl ethers, aromatic hydrocarbyl ethers or cyclic ethers, such as diethyl ether, di-n-propyl ether, di-n-butyl ether, di-isobutyl ether, diphenyl ether, methyl phenyl ether, tetrahydrofuran, or mixture thereof, with tetrahydrofuran being preferable.

The magnesium compound prepared and used in the present invention is characterized in that molar ratio of q to p is in the range from larger than 0 to 1, preferably from 0.05 to 0.95. This indicates that the magnesium compound of the present invention is different from conventional Grignard reagent, and contains a certain amount of magnesium halide. Not only this character makes the magnesium compound's preparation more convenient, but also the magnesium compound has less viscosity as compared with ether solution of $MgX_2$ in same volume and same concentration so that loading of the magnesium compound on carrier is facilitated.

The catalyst can be prepared through a process as described below in the present invention in its second aspect.

In the second aspect, the present invention provides a process for preparing the solid catalyst for ethylene polymerization, characterized in that said process comprises the steps of:

(1) Reacting powdered magnesium with an alkyl halide of formula RX in an ether solvent to form a magnesium compound having a structure represented by formula $(RMgX)_p(MgX_2)_q$, in which R is an alkyl group having from 3 to 12 carbon atoms, X is halogen, and molar ratio of q to p is in the range of from larger than 0 to 1, preferably from 0.05 to 0.95, wherein the molar ratio of the powdered magnesium to the alkyl halide is from 1:1 to 1:3, preferably from 1:1 to 1:2;

(2) Impregnating the magnesium compound onto silica carrier and drying to give a silica loading the magnesium compound, wherein the silica is used in such an amount that per gram silica loads from 0.5 to 5.0 mmol of magnesium element;

(3) Reacting the silica loading the magnesium compound as prepared in step (2) with an alkyl halide of formula $R^1X$, in which $R^1$ is an alkyl group having from 3 to 12 carbon atoms and X is halogen, in an alkane solvent to give a product, wherein the alkyl halide is used in such an amount that the molar ratio of Mg in the magnesium compound to the alkyl halide is in the range from 1:1 to 1:10, preferably from 1:1 to 1:8;

(4) Reacting the product obtained from step (3) with a titanium compound and an alkyl aluminum compound to form a main catalyst component, wherein the titanium compound has a structure represented by formula $Ti(OR^2)_mCl_{4-m}$, where $R^2$ is an alkyl group having from 1 to 4 carbon atoms and m is from 0 to 4, and the titanium compound is used in such an amount that the molar ratio of the Mg in the magnesium compound to the Ti in the titanium compound is in the range from 1:0.15 to 1:2.5, preferably from 1:0.3 to 1:2, and wherein the alkyl aluminum compound has a structure represented by formula $R^3_nAlCl_{3-n}$, where $R^3$ is an alkyl group having from 1 to 14 carbon atoms and n is from 1 to 3, and the alkyl aluminum compound is used in such an amount that the molar ratio of the Mg in the magnesium compound to the Al in the alkyl aluminum compound is in the range from 1:0.08 to 1:3, preferably from 1:0.1 to 1:2; and (5) Contacting the main catalyst component with a cocatalyst component to form the catalyst for ethylene polymerization, wherein the cocatalyst component is an organoaluminum compound, and the molar ratio of the Ti in the main catalyst component to the Al in the cocatalyst component is in the range from 1:30 to 1:300.

The silica used in the present invention is preferably subjected to heat treatment and/or chemical treatment prior to use to remove moisture in the carrier and a portion of hydroxy group on the surface of the carrier. The moisture contained in the silica can be removed by heat treatment performed at 100-200° C., and the hydroxy groups on the surface of the silica can be removed by calcination performed at a temperature over 200° C. The higher temperature, the less amount of the hydroxy groups on the surface of the silica. But too high temperature (such as 800° C.) may result in reduction of the pore volume of silica carrier, even breakage and agglomeration of carrier particles. In contrast, the removal of hydroxy group on the surface of silica by chemical method not only increases the activity of catalyst but also improves the morphology of carrier particles.

For example, silica may be treated by heating to a temperature of 500 to 800° C., preferably 600 to 700° C., and holding at that temperature for 2 to 12 hours, preferably 3 to 10 hours in a fluidized bed through which a gas stream, such as nitrogen or argon is passed, then it is discharged and stored for further reaction. The silica heat-treated is mixed with an alkane solvent, then the resulting slurry is contacted with an alkyl aluminum compound in an amount of 0.2 to 8 percent by weight of the silica, finally the alkane solvent is evaporated by heating to form silica carrier having excellent flowability.

The silica carrier used in the present invention has an average particle size of from 5 to 250 μm, preferably from 10 to 100 μm, and a surface area of at least 3 m²/g, preferably from 3 to 300 m²/g.

As described above, the magnesium compound as magnesium halide source used in the preparation process according to the present invention is nascent state magnesium halide represented by a formula $(RMgX)_p(MgX_2)_q$, in which R is an alkyl group having from 3 to 12 carbon atoms, X is halogen, preferably chlorine, and molar ratio of q to p is in the range from larger than 0 to 1, preferably from 0.05 to 0.95. The magnesium compound can be prepared by reacting powdered magnesium with an alkyl halide of formula RX in an ether solvent, wherein the alkyl halide is used in such an amount that the molar ratio of the powdered magnesium to the alkyl halide is in the range from 1:1 to 1:3, preferably from 1:1 to 1:2. When the reaction temperature is raised to 60 to 70° C., the alkyl halide is added to the powdered magnesium in one-step charging or dropwise. If dripping manner is employed, dripping period can be controlled in the range of from 10 minutes to 2 hours. Upon completion of the addition, the reaction is maintained for 2 to 8 hours, preferably 3 to 6 hours. The entire preparation procedure is performed at a temperature from 20 to 80° C., preferably from 40 to 70° C. The ether solvent may be aliphatic hydrocarbyl ethers, aromatic hydrocarbyl ethers or cyclic ethers, such as diethyl ether, di-n-propyl ether, di-n-butyl ether, di-isobutyl ether, diphenyl ether, methyl phenyl ether, tetrahydrofuran, or mixture thereof, with tetrahydrofuran being preferable.

The silica carrier heat treated and/or chemically treated is impregnated with the magnesium compound, wherein the silica is used in such an amount that per gram silica loads from 0.5 to 5.0 mmol of magnesium element, then a silica loading magnesium compound is obtained by drying. The resulting product contains from 0 to 25 percent by weight of ether solvent, based on the total weight of the product.

The key to prepare silica loading a magnesium compound is to load the magnesium compound onto the internal surface of the pores of silica carrier uniformly as much as possible. It is well known that under the condition of same concentration, the lower viscosity of an impregnating solution, the easier loading. Addition of more solvents can reduce the viscosity of the impregnating solution. In this case, however, in order to load same amount of magnesium compound, larger amount of impregnating solution needs to be handled, or even repetitious impregnating is necessary, therefore, operation procedure is more complicated. The present invention aims to make the viscosity of the impregnating solution meet the requirement for uniform loading under the circumstance that volume of impregnating solution is as less as possible to load the magnesium compound onto the internal surface of the pores of silica carrier uniformly as much as possible so as to obtain good loading effect. As described above, since the magnesium compound of the present invention effectively reduces the viscosity of impregnating solution, under the circumstance that the volume of impregnating solution is not greater than 3 times of the total pore volume of silica carrier, the viscosity of impregnating solution may be reduced to 10 mPa·s. Therefore, good loading effect is achieved in one-stage impregnating.

Impregnating silica carrier with the ether solution of magnesium compound can be carried out at a temperature of from 0 to 80° C., preferably from 10 to 65° C. The ether solution of magnesium compound can be added to the carrier, or the carrier can be added to the ether solution of magnesium compound while stirring. Upon completion of the addition, the resulting mixture is stirred for from 0.5 to 12 hours, preferably from 1 to 10 hours, and then ether solvent is evaporated at a temperature of from 60 to 85° C. to give a silica loading magnesium compound, wherein content of the ether solvent in the silica loading magnesium compound is controlled in a range of from 0 to 25 percent by weight, preferably from 5 to 20 percent by weight.

The action of alkyl halide of formula $R^1X$ is to convert the magnesium compound supported on silica to active magnesium halide. In a preferred process according to the present invention, silica loading magnesium compound is reacted with an alkyl halide of formula $R^1X$ at first, and the resulting product is then reacted with a titanium compound and an alkyl aluminum compound.

The reaction of silica loading magnesium compound with an alkyl halide of formula $R^1X$ is carried out in an alkane solvent, and the alkyl halide is used in such an amount that the molar ratio of the Mg in the magnesium compound to the alkyl halide is in a range of 1:1 to 1:10, preferably 1:1 to 1:8. The alkyl halide can be added in one-step charging or dropwise. If dripping manner is employed, dripping period can be controlled in a range of from 10 minutes to 2 hours. The preferred is one-step charging. Upon completion of the addition, the reaction is maintained for from 0.5 to 10 hours, preferably from 1 to 5 hours. The entire reaction is performed at a temperature from 10 to 80° C., preferably from 20 to 60° C. At the end of reaction, the reaction mixture may be dried to give a solid product, or may be directly introduced to subsequence reaction. The drying temperature is controlled at from 60 to 85° C.

In the alkyl halide useful in the present invention, the alkyl group has from 3 to 12 carbon atoms, and the alkyl halide is preferably alkyl chloride, such as propyl chloride, n-butyl chloride, isobutyl chloride, isopentyl chloride, or mixture thereof. In the steps (1) and (2) of the preparation process of catalyst according to the present invention, same or different alkyl halide can be used.

The reaction in which titanium compound and alkyl aluminum compound take part is also carried out in an alkane solvent. The product obtained from the above step is first added into the solvent to form a slurry. The titanium compound and alkyl aluminum compound can be added to the slurry simultaneously or successively. No matter dripping manner or one-step charging is employed, it is in the protection scope of the present invention. Upon completion of the addition, the mixture is allowed to react with stirring at a temperature of from 10 to 80° C., preferably from 20 to 60° C., for from 0.5 to 10 hours, preferably from 1 to 5 hours. Then the solvent is evaporated to form a main catalyst component. The evaporating temperature is controlled in a range from 60 to 85° C.

The alkane solvent is typically paraffins, such as isopentane, hexane, n-heptane, octane, nonane, decane, or mixture thereof.

The titanium compound used in the present invention is represented by formula $Ti(OR^2)_mCl_{4-m}$, wherein $R^2$ is an alkyl group having from 1 to 4 carbon atoms and m is 0-4. Examples of titanium compound include, but are not limited to, titanium tetrachloride, tetrabutyl titanate, methoxy titanium trichloride, butoxy titanium trichloride, or mixture thereof, with titanium tetrachloride being preferred.

The alkyl aluminum compound used in the present invention is represented by formula $R^3{}_nAlCl_{3-n}$, wherein $R^3$ is an alkyl group having from 1 to 14 carbon atoms and n is 1-3. Examples of alkyl aluminum compound include, but are not limited to, triethyl aluminum, triisopropyl aluminum, triisobutyl aluminum, tri-n-hexyl aluminum, tri-n-octyl aluminum, tri(2-ethylhexyl) aluminum, diethyl aluminum chloride, ethyl aluminum dichloride, diisopropyl aluminum chloride, ethyl aluminum sesquichloride, butyl aluminum sesquichloride, or mixture thereof, with diethyl aluminum chloride being preferred.

The order of steps (3) and (4) in the above preparation process may be changed, for instance, the silica loading magnesium compound as prepared in step (2) may react with a titanium compound and an alkyl aluminum compound, then react with an alkyl halide, with the kind and the amount of each components being unchanged.

The main catalyst component prepared through the above preparation process is optionally completely activated in situ by adding together with an activating agent at a certain ratio to polymerizing medium, or is optionally pre-activated with an activating agent prior to introduction into polymerizing medium. The activating agent used is an alkyl aluminum compound, such as diethyl aluminum chloride, triethyl aluminum, tri-n-hexyl aluminum, ethyl aluminum dichloride or mixture thereof. The amount of the activating agent is controlled based on the amount of residual ether solvent in the main catalyst component, usually being from 60 to 70 percent by mole of the residual ether solvent.

The main catalyst component contacts with a cocatalyst component to form the catalyst for ethylene polymerization of the present invention. The cocatalyst is an organo-aluminum compound, the composition proportion of the catalyst is such that molar ratio of the Ti in the main catalyst component to the Al in the cocatalyst component is in a range of from 1:30 to 1:300, preferably from 1:50 to 1:250.

Examples of the cocatalyst of the present invention include, but are not limited to, triethyl aluminum, diethyl aluminum chloride, triisobutyl aluminum, tri-n-hexyl aluminum, or mixture thereof, with triethyl aluminum being preferred.

Catalysts are easily deactivated by water or air, therefore, the main catalyst component in dry powder is usually sealed to store. Even if that, it is not suitable for long term storage. However, that the solid main catalyst component is mixed with a mineral oil and sealed up in the oil is in favor of the storage of the solid main catalyst component. The main catalyst component of the present invention may be suspended in an alkane solvent or a mineral oil. Since the existence of alkane solvent is not beneficial to resin used for packing or food, alkane solvent is not preferred. Therefore, the main catalyst component is preferably suspended in a mineral oil to form a slurry, and weight percent of the main catalyst component in the total slurry may be from 20 to 30%. The slurry formed by suspending the main catalyst component in a mineral oil can be directly used for ethylene polymerization.

In the third aspect, the present invention provides use of the ethylene polymerization catalyst according to the present invention in ethylene polymerization.

The high-activity polyethylene catalyst of the present invention can be used in any suitable polymerization process, including suspension, solution or gas phase polymerization, preferable gas phase polymerization, especially polymerization in a fluidized bed reactor.

In polymerization of ethylene, co-monomers may be added to adjust density of polyethylene product. Typical co-monomers are aliphatic alpha-olefins having from 3 to 8 carbon atoms. Suitable alpha-olefins include propene, 1-butene, 1-pentene, 1-hexene, 4-methyl-1-pentene, 1-heptene, and 1-octene. The preferred alpha-olefins are 1-butene and 1-hexene. Polyethylene product having a density of from 0.920 to 0.958 g/cc can be prepared by adding co-monomers.

In order to adjust melt index of polymer, a chain-transfer agent may be added. Suitable chain-transfer agent is hydrogen, or diethyl zinc added to the catalyst. When partial pressure of hydrogen introduced is varied in a range of from 10 to 50 percent, a polymer product having melt index $MI_{2.16}$ of from 0 to 60 g/10 minutes can be obtained.

The high-activity solid catalyst for ethylene polymerization according to the present, invention has the following advantages:

1. The polyethylene catalyst according to the present invention can be prepared in a simple manner and is completely suitable for production and application in industrial scale.
2. In the process according to the present invention, a magnesium compound having a specific structure is first prepared, and since it contain a certain amount of magnesium halide, it is easily supported onto carrier and less agglomerates is formed. Moreover, in combination with larger amount of titanium loaded, the polymerization activity of the catalyst is greatly increased.
3. The polyethylene catalyst according to the present invention has high polymerization activity. Under the conditions of polymerization temperature being 85-90° C., polymerization pressure being 2.0 MPa, and polymerization time being 3 hours, the activity can be up to from 15,000 to 20,000 grams polyethylene per gram catalyst. The catalyst has moderate initial activity, uniform heat liberation, good operation property, less agglomerate, excellent copolymerization property and good hydrogen response.

EMBODIMENTS OF THE INVENTION

The following examples are used to illustrate the present invention and by no means intended to limit the scope thereof.

In the examples of the specification, analysis of main components of the catalyst and test of main properties of polyethylene product are performed using the following methods:

Content of $Mg^{2+}$ is determined by EDTA (disodium ethylenediamine tetraacetic acid) titration;

Content of $Cl^-$ is determined by potentiometer titration;

Content of Ti is analyzed by colorimetry;

Amount of residual THF (tetrahydrofuran) is determined by analyzing the extract obtained by extracting solid product with acetone using gas chromatography;

Bulk density: The resin is poured via ⅜" diameter funnel into a 100 ml graduated cylinder to 100 ml line without shaking the cylinder, and weighed by difference. The values are reported $g/cm^3$.

Melt index is measured according to ASTM D-1238, condition E, at 190° C.; density of polymer is measured according to ASTM 1505.

PREPARATION EXAMPLE 1

Preparation of Magnesium Halide in Nascent State:

Into a 500 ml glass reaction vessel provided with a stirrer, a condenser, a dropping funnel and means for heating were charged 70 ml of tetrahydrofuran and 3.5299 g of powdered magnesium. The resulting mixture was heated to 60° C. and then slowly dropped 19 ml of n-butyl chloride. When about a half of the n-butyl chloride was dropped, to the reactor was added 140 ml of tetrahydrofuran, and then continuously dropped the remainder n-butyl chloride. The total time of dropping was controlled in 1 hour. Upon completion of the addition, the mixture was maintained at 60° C. for 3 hours and a black solution of a magnesium compound represented by formula $(BuMgCl)_p(MgCl_2)_q$ was obtained. The solution contains 0.6238 mmol/ml of Mg and 0.7743 mmol/ml of Cl, thus Cl/Mg=1.24, and q/p=0.32.

PREPARATION EXAMPLE 2

Preparation of Magnesium Halide in Nascent State:

Into a 500 ml glass reaction vessel provided with a stirrer, a condenser, a dropping funnel and means for heating were charged 70 ml of tetrahydrofuran and 3.5097 g of powdered magnesium. The resulting mixture was heated to 60° C. and then slowly dropped 18 ml of n-butyl chloride. When about a half of the n-butyl chloride was dropped, to the reactor was added 220 ml of tetrahydrofuran, and then continuously dropped the remainder n-butyl chloride. The total time of dropping was controlled in 1 hour. Upon completion of the addition, the mixture was maintained at 60° C. for 3 hours and a black solution of a magnesium compound represented by formula $(BuMgCl)_p(MgCl_2)_q$ was obtained. The solution contains 0.4436 mmol/ml of Mg and 0.4924 mmol/ml of Cl, thus Cl/Mg=1.11, and q/p=0.12.

PREPARATION EXAMPLE 3

Preparation of Magnesium Halide in Nascent State:

Into a 500 ml glass reaction vessel provided with a stirrer, a condenser, a dropping funnel and means for heating were charged 70 ml of tetrahydrofuran and 3.544 g of powdered magnesium. Then 1.02 ml of n-butyl chloride was added thereto at a temperature of 20° C. The resulting mixture was heated to 60° C. and then slowly dropped 22 ml of n-butyl chloride. When about a half of the n-butyl chloride was dropped, to the reactor was added 200 ml of tetrahydrofuran, and then continuously dropped the remainder n-butyl chloride. The total time of dropping was controlled in 1 hour. Upon completion of the addition, the mixture was maintained at 60° C. for 3 hours and a black solution of a magnesium compound represented by formula $(BuMgCl)_p(MgCl_2)_q$ was obtained. The solution contains 0.4555 mmol/ml of Mg and 0.6605 mmol/ml of Cl, thus Cl/Mg=1.45, and q/p=0.82.

PREPARATION EXAMPLE 4

Preparation of Magnesium Halide in Nascent State:
Into a 500 ml glass reaction vessel provided with a stirrer, a condenser, a dropping funnel and means for heating were charged 70 ml of tetrahydrofuran and 3.607 g of powdered magnesium. Then 1 ml of n-butyl chloride was added thereto at a temperature of 20° C. The resulting mixture was heated to 60° C. and then slowly dropped 24 ml of n-butyl chloride. When about a half of the n-butyl chloride was dropped, to the reactor was added 230 ml of tetrahydrofuran, and then continuously dropped the remainder n-butyl chloride. The total time of dropping was controlled in 1.5 hour. Upon completion of the addition, the mixture was maintained at 60° C. for 3 hours and a black solution of a magnesium compound represented by formula $(BuMgCl)_p(MgCl_2)_q$ was obtained. The solution contains 0.4142 mmol/ml of Mg and 0.5607 mmol/ml of Cl, thus Cl/Mg=1.35, and q/p=0.54.

PREPARATION EXAMPLE 5

Preparation of Magnesium Halide in Nascent State:
Into a 500 ml glass reaction vessel provided with a stirrer, a condenser, a dropping funnel and means for heating were charged 70 ml of tetrahydrofuran and 3.008 g of powdered magnesium. Then 1 ml of n-butyl chloride was added thereto at a temperature of 20° C. The resulting mixture was heated to 60° C. and then slowly dropped 20 ml of n-butyl chloride. When about a half of the n-butyl chloride was dropped, to the reactor was added 200 ml of tetrahydrofuran, and then continuously dropped the remainder n-butyl chloride. The total time of dropping was controlled in 1.5 hour. Upon completion of the addition, the mixture was maintained at 60° C. for 3 hours and a black solution of a magnesium compound represented by formula $(BuMgCl)_p(MgCl_2)_q$ was obtained. The solution contains 0.4857 mmol/ml of Mg and 0.7286 mmol/ml of Cl, thus Cl/Mg=1.50, and q/p=1.00.

EXAMPLE 1

1. Treatment of Silica Carrier
1) 14 g of silica was treated in a fluidized bed by heating to a temperature of 600° C. for 10 hours with nitrogen gas flow passing through. Then it was cooled to room temperature and was stored for further reaction.
2) Into 100 ml of hexane solution containing 0.9 ml of triethyl aluminum was added the heat-treated silica, then hexane was evaporated to give a silica carrier having excellent flowability.

2. Preparation of Main Catalyst Component
Into a reaction vessel was charged 18 ml of magnesium halide in nascent state as prepared in preparation example 1 and then was added 12.5 g of treated silica carrier. The mixture was stirred for 1.5 hours and then heated to a temperature of 70° C. with stirring to evaporate tetrahydrofuran. During the evaporation, solid component was sampled for analysis and the evaporation was stopped when the content of residual tetrahydorfuran in said solid was 5 percent by weight. A solid component was obtained.

To the resulting solid component were added 50 ml of hexane and 6.8 ml of n-butyl chloride. The mixture was heated with stirring to 65° C. and maintained at that temperature for 0.5 hours, and then 1.16 ml of titanium tetrachloride and 1.32 ml of diethyl aluminum chloride were added thereto. Upon completion of the addition, the mixture was allowed to react for 3 hours, and then hexane was evaporated at 70° C. A solid main catalyst component was obtained.

3. Polymerization
The polymerization reaction was carried out in a fluidized bed reactor having a diameter of 100 mm and a height of 1500 mm. First, 100 g of an oven-dried base of particulate polyethylene, 0.8 ml of triethyl aluminum as cocatalyst and 0.2 g of the main catalyst component as prepared in above step 2 were charged into the fluidized bed reactor. The polymerization was performed at a total pressure of 2.0 MPa, with the composition of the feed gas being ethylene 40%, $H_2$ 30%, butene 15%, and nitrogen gas 15%, and at a temperature of 90° C. for 3 hours, with white polyethylene being obtained. The polymerization reaction results were shown in Table 1.

EXAMPLE 2

1. Silica Carrier was Treated in a Manner Same as in Example 1.

2. Preparation of Main Catalyst Component
Into a reaction vessel was charged 11.6 g of the treated silica carrier and then was added 22 ml of black solution of magnesium halide in nascent state as prepared in preparation example 2 while stirring. The mixture was stirred for 1.5 hours and then heated to a temperature of 70° C. with stirring to evaporate tetrahydrofuran. During the evaporation, solid component was sampled for analysis and the evaporation was stopped when the content of residual tetrahydorfuran in said solid was 6.5 percent by weight. A solid component was obtained.

To the resulting solid component were added 50 ml of hexane and 6 ml of n-butyl chloride. The mixture was heated with stirring to 60° C. and maintained at that temperature for 0.5 hours, and then 1.1 ml of diethyl aluminum chloride and 0.88 ml of titanium tetrachloride were added thereto. Upon completion of the addition, the mixture was allowed to react for 3 hours, and then hexane was evaporated at 70° C. A solid main catalyst component was obtained.

3. Polymerization Reaction was Carried out According to the Procedure as Described in Example 1, and Polymerization Results were Shown in Table 1.

EXAMPLE 3

1. Silica Carrier was Treated in a Manner same as in Example 1.

2. Preparation of Main Catalyst Component:
Into a reaction vessel was charged 41 ml of magnesium halide in nascent state as prepared in preparation example 3 and then was added 13.3 g of treated silica carrier. The mixture was stirred for 2 hours and then heated to a temperature of 70° C. with stirring to evaporate tetrahydrofuran. During the evaporation, solid component was sampled for analysis and the evaporation was stopped when the content of residual tetrahydorfuran in said solid was 5.8 percent by weight. A solid component was obtained.

To the resulting solid component was added 70 ml of hexane, then was added 11.7 ml of n-butyl chloride over 30 minutes. The mixture was heated with stirring to 60° C. and maintained at that temperature for 0.5 hours, and then 1.02 ml of titanium tetrachloride and 1.1 ml of diethyl aluminum chloride were added thereto. Upon completion of the addition, the mixture was allowed to react for 3 hours, and then hexane was evaporated at 70° C. A solid main catalyst component was obtained.

3. Polymerization Reaction was Carried out According to the Procedure as Described in Example 1, and Polymerization Results were Shown in Table 1.

EXAMPLE 4

1. Silica Carrier was Treated in a Manner same as in Example 1.

2. Preparation of Main Catalyst Component:

Into a reaction vessel was charged 30 ml of magnesium halide in nascent state as prepared in preparation example 4 and then was added 8.8 g of treated silica carrier. The mixture was stirred for 1.5 hours and then heated to a temperature of 70° C. with stirring to evaporate tetrahydrofuran. During the evaporation, solid component was sampled for analysis and the evaporation was stopped when the content of residual tetrahydorfuran in said solid was 6.6 percent by weight. A solid component was obtained.

To the resulting solid component were added 70 ml of hexane and 5.15 ml of n-butyl chloride. The mixture was heated with stirring to 60° C. and maintained at that temperature for 0.5 hours, and then 0.71 ml of titanium tetrachloride and 0.79 ml of diethyl aluminum chloride were added thereto. Upon completion of the addition, the mixture was allowed to react for 3 hours, and then hexane was evaporated at 70° C. A solid main catalyst component was obtained.

3. Polymerization Reaction was Carried out According to the Procedure as Described in Example 1, and Polymerization Results were Shown in Table 1.

EXAMPLE 5

1. Silica Carrier was Treated in a Manner same as in Example 1.

2. Preparation of Main Catalyst Component:

Into a reaction vessel was charged 35 ml of magnesium halide in nascent state as prepared in preparation example 4 and then was added 10.8 g of treated silica carrier. The mixture was stirred for 1.5 hours and then heated to a temperature of 70° C. with stirring to evaporate tetrahydrofuran. During the evaporation, solid component was sampled for analysis and the evaporation was stopped when the content of residual tetrahydorfuran in said solid was 9.63 percent by weight. A solid component was obtained.

To the resulting solid component was added 60 ml of hexane. The mixture was heated to 50° C. with stirring, then 0.68 ml of titanium tetrachloride and 0.73 ml of diethyl aluminum chloride were added thereto. The mixture was allowed to react at that temperature for 1 hour, then 5.5 ml of n-butyl chloride was added. After the reaction was continued for 3.5 hours, hexane was evaporated at 70° C. A solid main catalyst component was obtained.

3. Polymerization Reaction was Carried out According to the Procedure as Described in Example 1, and Polymerization Results were Shown in Table 1.

EXAMPLE 6

1. Silica Carrier was Treated in a Manner same as in Example 1.

2. Preparation of Main Catalyst Component:

Into a reaction vessel was charged 10 g of the treated silica carrier and then was added 29 ml of black solution of magnesium halide in nascent state as prepared in preparation example 5 while stirring. The mixture was stirred for 2 hours and then heated to a temperature of 70° C. with stirring to evaporate tetrahydrofuran. During the evaporation, solid component was sampled for analysis and the evaporation was stopped when the content of residual tetrahydorfuran in said solid was 7.8 percent by weight. A solid component was obtained.

To the resulting solid component were added 50 ml of hexane and 11 ml of n-butyl chloride. The mixture was heated with stirring to 60° C. and maintained at that temperature for 1 hour, and then 0.85 ml of diethyl aluminum chloride and 0.61 ml of titanium tetrachloride were added thereto. Upon completion of the addition, the mixture was allowed to react for 3 hours, and then hexane was evaporated at 70° C. A solid main catalyst component was obtained.

3. Polymerization Reaction was Carried out According to the Procedure as Described in Example 1, and Polymerization Results were Shown in Table 1.

EXAMPLE 7

This Example employed the process described in Example 1 of U.S. Pat. No. 6,303,716 to prepare catalyst, and was used as comparative example of Examples 1-6.

1. Into a glass reaction vessel provided with a stirrer, a condenser, a dropping funnel and means for heating were charged 150 ml of hexane and 3.0024 g of powdered magnesium, followed by adding 35 ml of n-butyl chloride at 20° C. The resulting mixture was heated to 40° C. and maintained for 12 hours to form a black solid suspension, which was mixed with 250 ml of tetrahydrofuran after removal of hexane by evaporation. The solution contains 0.2656 mmol/ml of Mg and 0.4726 mmol/ml of Cl, thus Cl/Mg=1.78, and q/p=3.5.

2. Into a glass reaction vessel were charged 80 ml of the black solid suspension as prepared in step 1, 1.6 ml of titanium tetrachloride and 2.1 ml of diethyl aluminum chloride, and the mixture was heated with stirring to a temperature of 70° C. To the resulting mixture was added 12.8 g of silica gel heat-treated and chemically treated, then tetrahydrofuran was evaporated. The amount of residual tetrahydrofuran was controlled to about 12%, thus a main catalyst component was obtained.

3. Polymerization reaction was carried out according to the procedure as described in Example 1, and polymerization results were shown in Table 1.

EXAMPLE 8

23.7 g main catalyst component as prepared in Example 2 was mixed with 60 ml of mineral oil (HydroBrite® 550 colorless mineral oil) to form a slurry material. To the slurry was added 1.3 ml of diethyl aluminum chloride. The resulting mixture was stirred at room temperature for 2 hours, and the resulting slurry can be directly used in polymerization.

Slurry polymerization was carried out in a 2 L reactor at 80° C. under 0.8 MPa pressure for 4 hours, with amount of triethyl aluminum added being 1.4 ml, and amount of catalyst added being 0.3202 g (solid content 0.0624 g). 700 g of white polyethylene was obtained. The product has a bulk density of 0.38 g/cm$^3$.

EXAMPLE 9

0.0731 g of the main catalyst component as prepared in Example 2 was used in slurry polymerization carried out in a 2 L reactor. Reaction conditions were identical with that described in Example 8. 750 g of white polyethylene was obtained. The product has a bulk density of 0.37 g/cm$^3$.

EXAMPLE 10

Polymerization experiments were carried out using the main catalyst component as prepared in Example 1, in same procedure as Example 1, and under same polymerization conditions as that of Example 1 except that the composition of polymerization gases was changed. The experiments were numbered as 1, 2, 3, 4 and 5, respectively. The results were shown in Table 2.

TABLE 1

| Example No. | $(BuMgCl)_p(MgCl_2)_q$ q/p | Content of Ti in the catalyst (Ti %) | Catalyst Activity (gPE/gcat) | Bulk density (g/cm$^3$) |
| --- | --- | --- | --- | --- |
| 1 | 0.32 | 2.54 | 19056 | 0.39 |
| 2 | 0.12 | 2.16 | 15888 | 0.40 |
| 3 | 0.82 | 1.61 | 14352 | 0.39 |
| 4 | 0.54 | 2.30 | 15072 | 0.34 |
| 5 | 0.54 | 2.26 | 15539 | 0.36 |
| 6 | 1.00 | 2.08 | 15081 | 0.33 |
| 7 | 3.50 | 1.92 | 6300 | 0.25 |

TABLE 2

| | Conditions for polymerization | | | | Results of polymerization | | | |
| --- | --- | --- | --- | --- | --- | --- | --- | --- |
| | | | Composition of the feed gas | | | Polymerization | Properties of Products | | |
| Experiment No. | Pressure (MPa) | Temperature ° C. | $H_2/C_2H_4$ (mol/mol) | $C_4H_8/C_2H_4$ (mol/mol) | Partial pressure of $C_2H_4$ (MPa) | Activity (g PE/g Cat.) | Density (g/cm$^3$) | $MI_{2.16}$ (g/10 min) | Bulk Density (g/cm$^3$) |
| 1 | 2.0 | 90 | 0.13 | 0.35 | 0.80 | 18000 | 0.920 | 2.0 | 0.35 |
| 2 | 2.0 | 95 | 0.20 | 0.35 | 0.85 | 16000 | 0.921 | 4.5 | 0.33 |
| 3 | 2.0 | 105 | 0.12 | 0.02 | 1.30 | 15000 | 0.958 | 1.0 | 0.38 |
| 4 | 2.0 | 100 | 0.10 | 0.38 | 0.85 | 19000 | 0.918 | 1.0 | 0.36 |
| 5 | 2.0 | 90 | 0.40 | 0.35 | 0.85 | 10000 | 0.925 | 8.0 | 0.34 |

Although the present invention has been described in connection with embodiments and examples, further modifications and alternative embodiments of various aspects of the invention will be apparent to those skilled in the art in view of this description. Accordingly, this description is to be constructed as illustrative only and is for the purpose of teaching the general manner of carrying out the invention. Additionally, all cited documents are wholly incorporated into this description by reference.

What is claimed is:

1. A process for preparing a catalyst for ethylene polymerization, the catalyst comprising a magnesium halide derived from a magnesium compound represented by a formula $(RM_gX)_p(MgX_2)_q$, in which R is an alkyl group having from 3 to 12 carbon atoms, X is halogen, and the molar ratio of q to p is between 0 and 1; wherein the solid catalyst for the ethylene polymerization is prepared by a process comprising:

(1) reacting powdered magnesium with an alkyl halide of formula RX in an ether solvent to form a magnesium compound having a structure of formula $(RMgX)_p(MgX_2)_q$, in which R is an alkyl group having from 3 to 12 carbon atoms, X is halogen, and the molar ratio of q to p is between 0 and 1, wherein the molar ratio of the powdered magnesium to the alkyl halide is from 1:1 to 1:3;

(2) impregnating the magnesium compound onto silica carrier and drying to provide a magnesium compound-loaded silica support, wherein the silica is used in such an amount that per gram silica loads from 0.5 to 5.0 mmol of magnesium element;

(3) reacting the magnesium compound-loaded silica support of step (2) with an alkyl halide of formula $R^1X$, in which $R^1$ is an alkyl group having from 3 to 12 carbon atoms and X is halogen, in an alkane solvent to give a product, wherein the molar ratio of Mg in the magnesium compound to the alkyl halide is in the range from 1:1 to 1:10;

(4) reacting the product obtained from step (3) with a titanium compound and an alkyl aluminum compound to form a main catalyst component, wherein the titanium compound has a structure represented by formula $Ti(OR^2)_mCl_{4-m}$, $R^2$ is an alkyl group having from 1 to 4 carbon atoms and m is from 0 to 4, the molar ratio of the Mg in the magnesium compound to the Ti in the titanium compound is in the range from 1:0.15 to 1:2.5, and wherein the alkyl aluminum compound has a structure represented by formula $R^3{}_nAlCl_{3-n}$, $R^3$ is an alkyl group having from 1 to 14 carbon atoms and n is from 1 to 3, the molar ratio of the Mg in the magnesium compound to the Al in the alkyl aluminum compound is in the range from 1:0.08 to 1:3; and (5) contacting the main catalyst component with a cocatalyst component to form the catalyst for ethylene polymerization, wherein the cocatalyst component is an organo-aluminum compound, and the molar ratio of the Ti in the main catalyst component to the Al in the cocatalyst component is in the range from 1:30 to 1:300.

2. The process according to claim 1, wherein the molar ratio of q to p is in the range of from 0.05 to 0.95.

3. The process according to claim 1, wherein X in the magnesium compound is chlorine.

4. The process according to claim 1, wherein the ether solvent is aliphatic hydrocarbyl ethers, aromatic hydrocarbyl ethers or cyclic ethers.

5. The process according to claim 4, wherein the ether solvent is diethyl ether, di-n-propyl ether, di-n-butyl ether, di-isobutyl ether, diphenyl ether, methyl phenyl ether, tetrahydrofuran, or mixture thereof.

6. The process according to claim 1, wherein the organoaluminum compound is triethyl aluminum, diethyl aluminum chloride, triisobutyl aluminum, tri-n-hexyl aluminum, or mixture thereof.

7. The process according to claim 1, wherein the alkyl halide of formula RX and formula $R^1X$ is an alkyl chloride.

8. The process according to claim 7, wherein the alkyl halide of formula RX and formula $R^1X$ is independently chloropropane, chloro-n-butane, isobutyl chloride, isopentyl chloride or mixture thereof.

9. The process according to claim 1, wherein the titanium compound is titanium tetrachloride, tetrabutyl titanate, methoxy titanium trichloride, butoxy titanium trichloride, or mixture thereof.

10. The process according to claim 1, wherein the alkyl aluminum compound is triethyl aluminum, triisopropyl aluminum, triisobutyl aluminum, tri-n-hexyl aluminum, tri-n-octyl aluminum, tri(2-ethylhexyl) aluminum, diethyl aluminum chloride, ethyl aluminum dichloride, diisopropyl aluminum chloride, ethyl aluminum sesquichloride, butyl aluminum sesquichloride, or mixture thereof.

11. The process according to claim 1, wherein the alkane solvent is an paraffin hydrocarbon.

12. The process according to claim 11, wherein the alkane solvent is isopentane, hexane, n-heptane, octane, nonane, decane, or mixture thereof.

* * * * *